(12) United States Patent  (10) Patent No.: US 9,115,978 B2
Paganini  (45) Date of Patent: Aug. 25, 2015

(54) MEASUREMENT DEVICE FOR MEASURING THE ANATOMICAL SHAPE OF THE LEG

(75) Inventor: Riccardo Paganini, Passo Del Tonale (IT)

(73) Assignee: Cabra Engineering S.R.L., Darfo Boario Terme (IT)

( * ) Notice: Subject to any disclaimer, the term of this patent is extended or adjusted under 35 U.S.C. 154(b) by 57 days.

(21) Appl. No.: 13/991,218

(22) PCT Filed: Nov. 30, 2011

(86) PCT No.: PCT/EP2011/071382
§ 371 (c)(1),
(2), (4) Date: Jun. 21, 2013

(87) PCT Pub. No.: WO2012/072680
PCT Pub. Date: Jun. 7, 2012

(65) Prior Publication Data
US 2013/0286383 A1  Oct. 31, 2013

(30) Foreign Application Priority Data

Dec. 1, 2010 (EP) .................................... 10425367

(51) Int. Cl.
*G01B 9/10* (2006.01)
*A43D 1/02* (2006.01)
(52) U.S. Cl.
CPC . *G01B 9/10* (2013.01); *A43D 1/025* (2013.01)
(58) Field of Classification Search
USPC ............ 356/601–614, 138; 250/201.3, 492.2, 250/442.11; 382/152, 128–133
See application file for complete search history.

(56) References Cited

U.S. PATENT DOCUMENTS

| 4,662,079 | A | | 5/1987 | Graf et al. |
| 4,721,388 | A | * | 1/1988 | Takagi et al. ................. 356/602 |
| 5,694,219 | A | * | 12/1997 | Kim .............................. 356/615 |
| 5,822,873 | A | | 10/1998 | Meilman |
| 7,379,193 | B2 | * | 5/2008 | Liu ............................... 356/603 |
| 7,421,789 | B1 | | 9/2008 | Sullivan |
| 7,426,022 | B2 | * | 9/2008 | Oka .............................. 356/218 |
| 7,619,190 | B2 | * | 11/2009 | Kuo et al. .................. 250/201.3 |
| 7,986,402 | B2 | * | 7/2011 | Wang et al. ................. 356/237.1 |
| 8,189,183 | B2 | * | 5/2012 | Shih et al. .................. 356/237.1 |
| 2002/0027652 | A1 | * | 3/2002 | Paromtchik et al. ....... 356/141.1 |
| 2004/0193075 | A1 | | 9/2004 | Martindale |
| 2005/0021170 | A1 | * | 1/2005 | Gustafsson et al. .......... 700/186 |
| 2005/0025353 | A1 | * | 2/2005 | Kaneko et al. ............... 382/152 |

FOREIGN PATENT DOCUMENTS

GB  2312754 A  11/1997

OTHER PUBLICATIONS

European Search Report for EP10425367, dated May 3, 2011.
PCT International Search Report for PCT/EP2011/071382, mailed Mar. 21, 2012.

* cited by examiner

*Primary Examiner* — Sang Nguyen
(74) *Attorney, Agent, or Firm* — LeClairRyan, a Professional Corporation

(57) ABSTRACT

The present invention relates to a device (1) for measuring the anatomical shape of the leg comprising a support frame (10) and an angle measuring instrument (20) connected to said support frame (10). The device according to the present invention is characterized in that said angle measuring instrument (20) comprises at least one goniometer (22*a*, 22*b*) and at least one rod (21) hinged to said goniometer (22*a*, 22*b*), and in that it also comprises light spot projecting means (23*a*, 23*b*) connected to said angle measuring instrument (20).

14 Claims, 4 Drawing Sheets

MEASUREMENT DEVICE FOR MEASURING THE ANATOMICAL SHAPE OF THE LEG

This application is a national stage application under 35 U.S.C. §371 of PCT Application No. PCT/EP2011/071382, filed Nov. 30, 2011, which claims the benefit of European Patent Application No. 10425367.9, filed Dec. 1, 2010, each of which is hereby incorporated by reference in its entirety.

FIELD OF THE INVENTION

The present invention relates to a measurement device or instrument, suitable for measuring the anatomical shape of the leg.

PRIOR ART

There are multiple applications of the measurement device according to the present invention in the range from post-traumatic rehabilitation to applications in sports environment.

Indeed, the anatomical shape of the leg is known to significantly vary from person to person, in particular with significant differences in the frontal and side tibial angles, i.e. taken on the frontal and sagittal planes.

These subjective differences in the anatomical shape of the leg take significant importance in several cases, but in particular the circumstance of exactly knowing the shape of the leg may be deemed to occur in sports environment, in particular in downhill skiing, when the sportsperson wears rigid or semi-rigid footwear.

Indeed, in this case, there is the need to determine the correct alignment between footwear and shape of the leg.

Technical footwear is indeed known on the market, which provides for various possibilities of inclination adjustment, on the frontal but also sagittal plane, of the quarter of the shoe or boot, i.e. the part enveloping the tibia.

In particular, several variants of boots are known in the field of ski footwear which permit to adjust the inclination of the quarter by means of devices intended for this purpose. These devices may be provided both inside and outside the footwear, and they implement what is known in the field as "canting", i.e. the adjustment of the quarter inclination with respect to the vertical direction, especially on a frontal plane but also, in certain cases, on the sagittal plane.

It is thus apparent that the optimal adjustment of the canting angles of sports footwear is directly related to the anatomical shape of the leg, as the possibilities of adjusting the quarter canting are specifically studied to make the footwear increasingly comfortable and to improve the user's sports performance with the possibility of being adapted to the individual anatomical shape.

Not only, by adjusting the boot canting, the weight distribution on skis and the ski angle itself to the ground are varied.

As seen in figures from 1 to 3, the most common natural anatomical shapes of the leg involve the knees substantially in axis on the same line as the leg and the ankles (see FIG. 1), or a circumstance of valgus knee (see FIG. 2), in which the knees are inwards with respect to the vertical line passing through the ankle, or even a circumstance of varus knee, as shown in FIG. 3, in which the knees tend to be outwards with respect to the vertical line passing through the ankle.

It is thus understood that the assessment of the natural anatomical shape of the leg is very importance in light of the modifications of the canting alignment of sports footwear, e.g. ski boots. Indeed, it should also be considered that when the stance of the leg and the weight distribution vary according to said stance, the boot inclination varies with respect to the ground, and thus the skier's whole stance varies.

Therefore, it is understood that exactly knowing the neutral position (i.e. of boot canting adjustment) which suits the anatomical shape of the user's leg and allows to have the boot sole perfectly parallel to the ground is extremely important, so that the user may then intervene on the canting adjustment when he/she wishes to obtain a different boot inclination angle with respect to the ground.

Indeed, it is readily understood that, in the absence of accurate data about the actual anatomical shape of the leg, the canting adjustments directly made on the boot could not effectively result in the desired effects, or could even generate the opposite effect.

Therefore, in order to detect the actual anatomical shape of the user's leg, measurement instruments substantially based on the manual usage of a mechanical goniometer are currently in use.

At present, the measurement is manually taken by a technician who places a mechanical goniometer to which a rod is simply connected and, from the minimum allowable distance permitted by the shape of the leg, he/she sights while taking the measurement again in a manual manner. The technician holds the goniometer resting at the ankle and measures the leg inclination angle on a frontal plane, while keeping the rod connected to the goniometer against the tibia, as much as possible.

This way of manually and mechanically taking the measurement of the anatomical shape of the leg has several drawbacks.

Among these drawbacks, the main issue consists of the accuracy lack of the measurement taken, as it is so approximate to not be repeated for certain, and hence it is not reliable.

The accuracy lack of the measurement is not due to the reading of the angle indicated on the goniometer carried out by the technician taking the measurement, but to the approximate, unstable positioning of the measuring instrument along the patient's leg, and due to the difficulty in accurately identifying where the measurement may be taken.

SUMMARY OF THE INVENTION

It is therefore the primary task of the present invention to provide a new device for measuring the anatomical shape of the leg which allows the suppression of the drawbacks afflicting the prior art devices of known type.

Within the scope of this task, it is the object of the present invention to provide a device for measuring the anatomical shape of the leg which allows the tibial shape to be correctly measured, both on the frontal plane and on the sagittal plane, in an accurate, precise and repeated manner.

It is a further object of the present invention to provide a measurement device which takes an electronic measurement of the angles involved thus allowing the acquisition and management of the measured data by means of a personal computer, to which the device may be connected.

This task and these and other objects which will become more apparent hereinafter, are achieved by a measurement device as claimed in the appended claims.

In particular, the device for measuring the anatomical shape of the leg according to the present invention comprises at least one structure or support frame for supporting and stably positioning an angle measuring instrument comprising at least one mechanical or digital goniometer, and at least one rod hinged to said goniometer, which is characterized in that said rod connected to the measuring instrument supports movable means for projecting a light spot and in that said measuring instrument is slidingly associated with guide means.

BRIEF DESCRIPTION OF THE DRAWINGS

Further features and advantages of the present invention will become more apparent from the following detailed description, given by way of non-limiting example and shown in the accompanying drawings, in which.

DETAILED DESCRIPTION OF THE PREFERRED EMBODIMENTS OF THE INVENTION

Figures 1, 2:
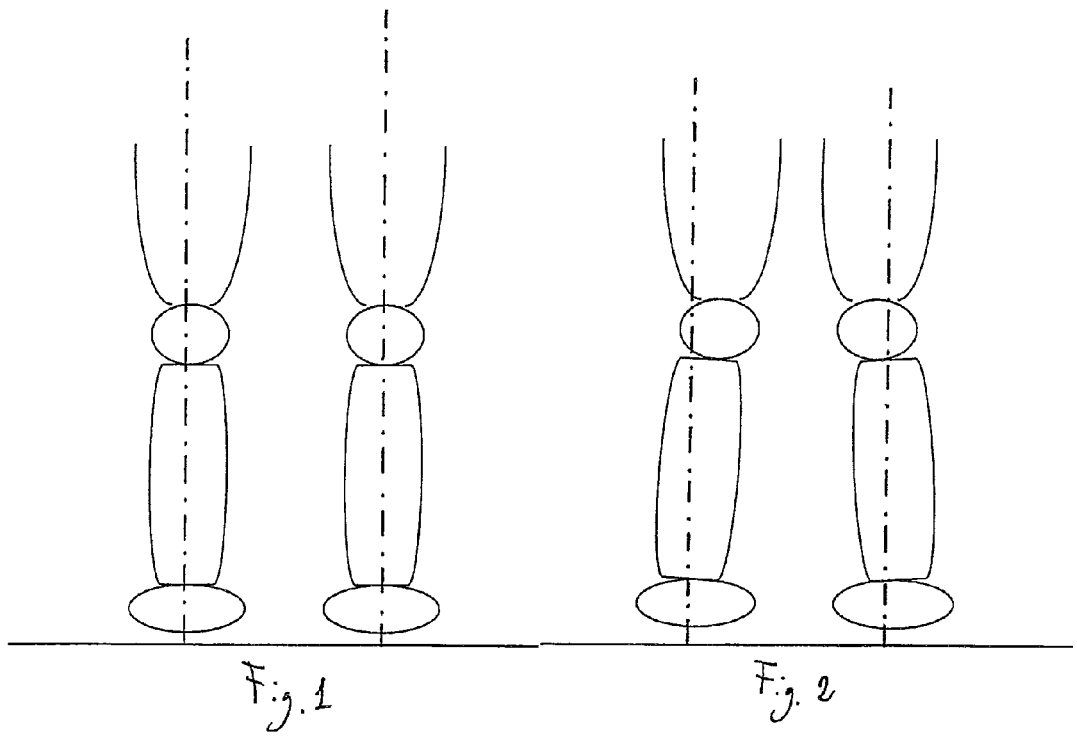
FIGS. 1 to 3 show various possible natural anatomical configurations of a person's leg, with neutral, varus and valgus configurations, respectively.
Figure 3:
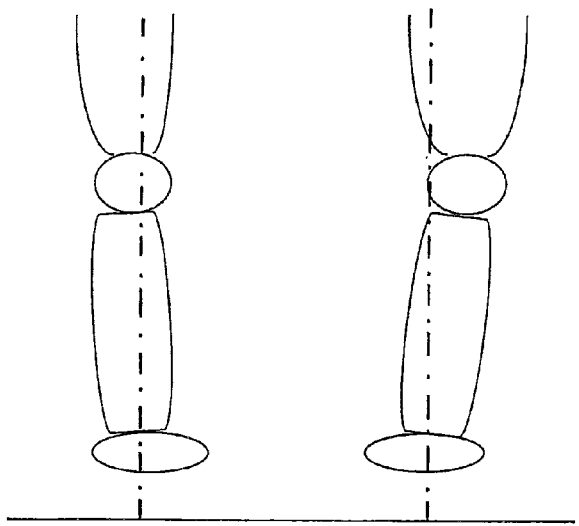

According to the preferred embodiments of the present invention shown in the mentioned figures by way of non-limiting example, device 1 for measuring the anatomical shape of the leg comprises a support frame 10 comprising in turn at least one horizontal base 11 intended to rest on the ground and at least one pair of substantially vertical side shoulders 12, 13.

The measurement device comprises an angle measuring instrument 20 comprising in turn at least one goniometer 22a, 22b and at least one rod 21 hinged to said goniometer so as to be inclined with respect to the vertical direction. Said angle measuring instrument 20 also comprises, longitudinally associated with said rod 21 in a sliding manner, at least one pair of means for projecting a light spot 23a, 23b. In order to make the light spot projecting means 23a and 23b sliding with respect to rod 21, the latter is conveniently provided with an axial groove 24.

According to a preferred embodiment of the present invention, these light spot projecting means advantageously consist of laser pointers. Therefore, in the examples shown, first 23a and second 23b laser pointers are provided slidingly associated with rod 21 and comprise locking means (not shown in the accompanying figures) suitable for firmly securing said pointers in any position along rod 21, in particular anywhere chosen by the technician in said axial groove 24.

In order to ensure the stable positioning of the measuring instrument when the measurement is being taken, the angle measuring instrument 20 is conveniently supported by guide means 4, 5.

Figure 4:
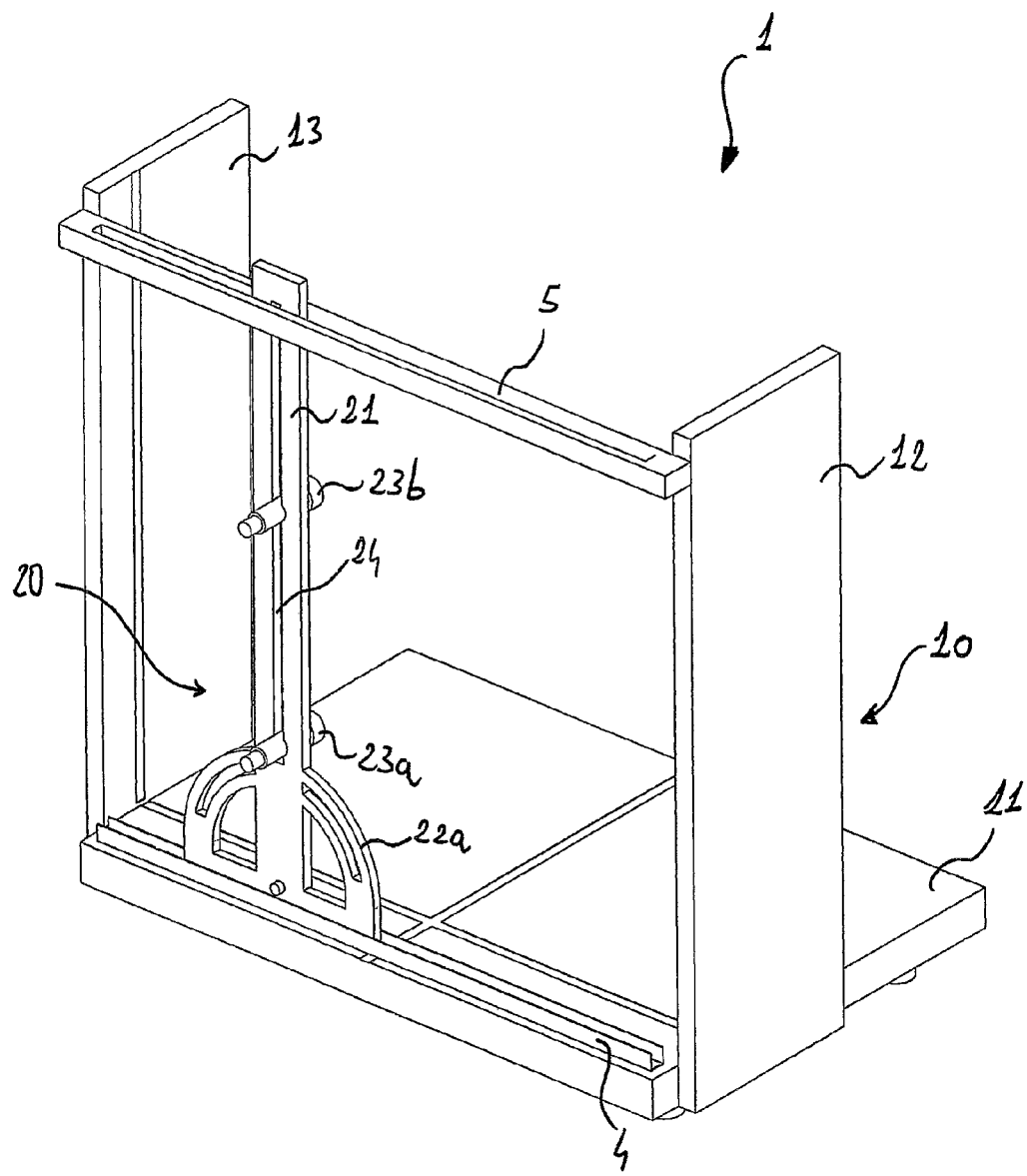
FIG. 4 shows a whole perspective view of a first preferred embodiment of the measurement device according to the present invention.
Figure 5:
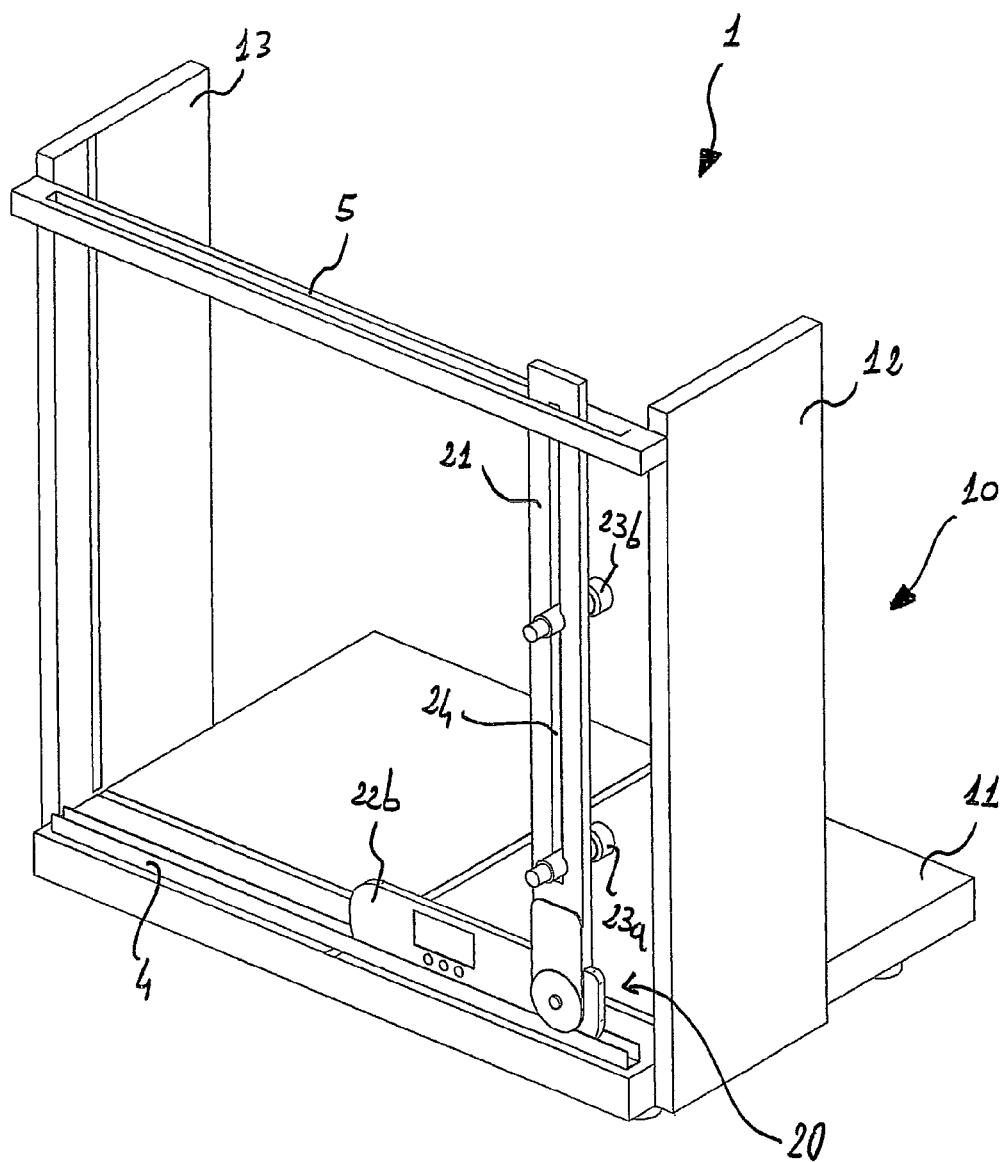
FIG. 5 shows a whole perspective view of a second preferred embodiment of the measurement device according to the present invention.

In particular, according to the preferred embodiments shown in FIGS. 4 and 5, said guide means comprise at least one lower guide 4 which allows the angle measuring instrument 20 to slide in the transversal direction on a frontal plane, in particular by holding the lower end of said measuring instrument 20 at which the goniometer 22a, 22b is placed, and at least one upper guide 5 which anchors the upper end of said angle measuring instrument 20 adapted to guide the movement of said upper end, again on the frontal plane. In particular, the preferred embodiment provides for the free end of said rod 21, i.e. the end opposite to the end hinged to said goniometer, to be inserted into said upper guide 5.

The lower guide 4 advantageously runs along base 11 and is contained in the frontal plane, while the upper guide 5 is supported by vertical side shoulders 12 and 13 at its ends, and it is also contained in the same frontal plane, and thus the whole angle measuring instrument 20 is contained in the same frontal plane.

FIG. 4 shows a first preferred embodiment of the device according to the present invention in which goniometer 22a is a traditional mechanical goniometer.

FIG. 5 shows a second embodiment of the device according to the present invention in which goniometer 22b is a digital goniometer, i.e. capable of providing an electronic indication of the angle measurement taken. The further advantage of directly connecting the measuring instrument 1 to a computer is obtained by means of this second embodiment, in order to store a plurality of data and readings, so as to also collect a statistical indication of the measurements taken and to create a reference databank, which is useful for tracing the features of each individual athlete.

The operation of measurement device 1 according to the present invention is therefore as follows.

The user frontally stands by stepping on the base 11 and thus positioning the front part of the leg towards the measuring instrument 20.

The technician will take care of positioning the light spot generated by the first laser pointer 23a, the lower pointer, at the medial position of the tibia base, immediately above the user's instep.

As mentioned, in order to correctly place the first light spot, the technician may translate the measuring instrument 20 along the guides 4 and 5 to align the measuring instrument to the user's leg.

Once the first light spot has been correctly positioned, the technician may move the rod 21, hinged at the lower end thereof to the goniometer 22a, 22b and guided at the top by the presence of the upper guide 5 to move again on a frontal plane, until the second light spot generated by the second laser pointer 23b is at the anatomical point of the tibia, between the first point and the knee joint, according to the leg anatomy, substantially immediately below the knee joint, in the medial point of the wider part of the calf.

First and second light spots are to be positioned by the technician on the leg at the median axis of the leg itself, and therefore in line with the tibia axis. To this end, the technician may use convenient means suitable for marking the points at which the light spots are to be positioned. Among these means, writing instruments may be mentioned such as for example pencil, ballpoint, felt-tip pen and the like, or instruments suitable for visually noting the point, such as a graduated strip or an adhesive element or the like, so as to highlight the two reference measuring points.

Figure 6:
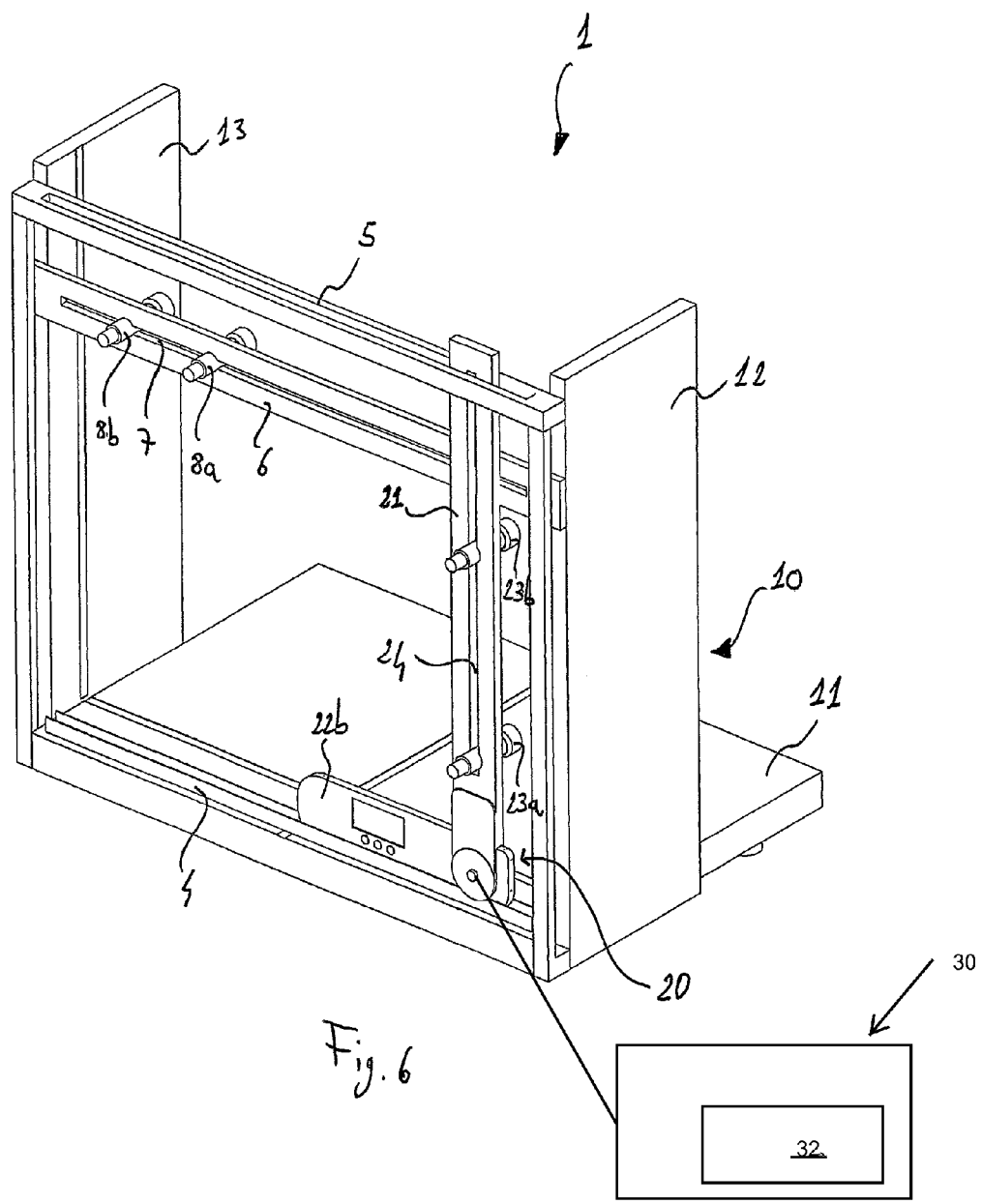
FIG. 6 shows a whole perspective view of a third preferred embodiment of the measurement device according to the present invention.

According to a preferred embodiment of the measurement device according to the present invention shown by way of example in accompanying FIG. 6, the device for measuring the anatomical shape of the leg may advantageously comprise further means 5, 6, 7, 8a, 8b for correctly identifying the reference measuring points.

As shown by way of example, said means for correctly identifying the reference measuring points may comprise a further horizontal tibial rod 6 provided with an axial guide groove 7 and slidingly associated with the side shoulders 12, 13 so as to be height positioned as required.

Further light spot projecting means are provided along said horizontal tibial rod 6, in particular sliding in turn in the horizontal direction along the axial guide groove 7, which means may preferably consist of a pair of laser pointers 8a, 8b.

The means described heretofore for correctly identifying the reference measuring points 5, 6, 7, 8a, 8b may thus be employed by the technician (assisted by the device and hence in a more accurate and reliable manner) to identify the measuring points, which operation has been described above in manual mode.

Therefore. in particular, the technician may vertically place the tibial rod 6 to be close to the ankle, immediately above the instep. The light spot projection from the pointers 8a and 8b will laterally lap the ankle on the inner and outer sides, thus allowing the technician to identify the first measuring point on the median axis of the leg, i.e. at the tibia axis.

Once this first point has been identified, the technician may move the tibial rod 6 upwards by sliding it vertically to place it at the point immediately below the knee joint, at the medial point of the widest part of the calf. Even in this case, the light beam from the pointers 8a and 8b will lap the leg on the inner and outer sides, respectively, at the widest point of the calf, thereby allowing the technician to easily identify the second measuring point on the axis of the leg.

As in the case of identifying the first measuring point, the horizontal movement of pointers 8a and 8b along rod 6 allows the technician to easily identify the widest point of the calf and the narrowest point of the ankle, due to the possibility of placing the pointers in the horizontal direction.

Obviously, in order to make each operation performed by the technician during the measuring step easier as well as more accurate and repeatable, both the goniometers and the vertical 21 and horizontal 6 rods will advantageously be graduated, with at least one millimetric scale.

Returning to the measurement, as mentioned, in order to correctly place the light spots for the measuring, the technician may easily take advantage of the possibility of adjusting the device, by changing the height of the two laser pointers 23a and 23b along rod 21, thus translating the whole angle measuring instrument 21 along the lower guide 4, and rotating the rod 21 guided by the upper guide 5, with respect to the hinging point of its lower end to the goniometer.

Therefore, by correctly positioning the first and second light spots generated by the laser pointers, the technician may directly read on the mechanical 22a or digital 22b goniometer, the angle measurement of the anatomical shape of the leg on the frontal plane involved for the above-discussed canting adjustments.

The operations described heretofore for measuring the anatomical shape of a leg may be easily repeated on the other leg by simply moving the angle measuring instrument 20 along the lower guide 4 to place the instrument at the second leg.

Therefore, the measurement device according to the present invention also allows the anatomical parameters of the leg to be measured on a sagittal plane.

In order to detect such a shape of the leg on the sagittal plane, the user may step on the base 11 thus having the measuring instrument by the side of the leg.

It has thus been shown how the measurement device for measuring the anatomical shape of the leg achieves the purpose and objects suggested.

Several modifications may be made by the person skilled in the art without departing from the scope of protection of the present application.

Therefore, the scope of protection of the claims should not be limited by the preferred disclosures or embodiments shown in the description of the present invention by way of example, but rather all different forms of the invention which are equally useful by employing the same innovative concept fall within the scope of the present application. In this sense, the movement of the movable parts of the device, including the two or more laser pointers may be automated by means of suitable motorizations, e.g. electric motorizations, and these pointers may be assisted by electric, electronic or automated motorizations and/or by servo assisted motorizations by using a specific software program with a PC, video camera or other technological medium according to modifications available to the design technician. Referring to FIG. 6, in one example, the device 1 includes a motorized driving apparatus 30 coupled to the device 1 to move one or more movable parts of the device 1, such as first 23a and second 23b laser pointers. The motorized driving apparatus 30 is controlled by a programmable electronic control unit 32.

The invention claimed is:

1. A device for measuring anatomical shape of a leg comprising:
   a support frame;
   at least one angle measuring instrument connected to said support frame, said angle measuring instrument comprising at least one goniometer and at least one rod hinged to said goniometer, wherein said support frame comprises a base disposed perpendicular to opposing sides of said support frame and configured to receive a foot of a user to position a front portion of a leg of the user toward said at least one angle measuring instrument; and
   a light spot projecting device connected to said angle measuring instrument.

2. The device for measuring the anatomical shape of the leg according to claim 1, wherein said light spot projecting device is connected to said rod and is movable with respect thereto.

3. The device for measuring the anatomical shape of the leg according to claim 1, wherein said light spot projecting device comprises a laser pointer.

4. The device for measuring the anatomical shape of the leg according to claim 1, wherein said light spot projecting device comprises at least a first laser pointer slidingly associated, by an axial guide, with said rod close to the hinging point with said goniometer, and at least a second laser pointer slidingly associated, by said axial guide, with said rod in a position closer to the end thereof opposite to the end hinged to the goniometer.

5. The device for measuring the anatomical shape of the leg according to claim 1, wherein said support frame further comprises at least one pair of substantially vertical side shoulders.

6. The device for measuring the anatomical shape of the leg according to claim 1, further comprising a frame guide disposed on said support frame for moving said angle measuring instrument.

7. The device for measuring the anatomical shape of the leg according to claim 6, wherein said frame guide comprises a lower guide which allows said angle measuring instrument to slide in the transversal direction.

8. The device for measuring the anatomical shape of the leg according to claim 7, wherein said frame guide further comprises an upper guide, included in the same frontal plane of said lower guide and substantially parallel thereto, which guides the transversal sliding of said angle measuring instrument.

9. The device for measuring the anatomical shape of the leg according to claim 8, wherein a free end of said rod of said angle measuring instrument is inserted into said upper guide.

10. The device for measuring the anatomical shape of the leg according to claim 7, wherein said goniometer is forced to transversally slide along the frame along said lower guide.

11. The device for measuring the anatomical shape of the leg according to claim 1, wherein said goniometer is a digital electronic measuring instrument.

12. The device for measuring the anatomical shape of the leg according to claim 1, further comprising a reference identification apparatus that correctly identifies one or more reference measuring points.

13. The device for measuring the anatomical shape of the leg according to claim 12, wherein said reference identification apparatus comprises at least one horizontal rod slidingly associated with said side shoulders, said horizontal rod being provided with an axial guide groove within which the light spot projecting device is slidingly positioned.

14. The device for measuring the anatomical shape of the leg according to claim 1, further comprising a motorized driving apparatus to move one or more movable parts of the device, said motorized driving apparatus being controlled by programmable electronic control unit.

\* \* \* \* \*